US008834699B1

(12) United States Patent
Knowles

(10) Patent No.: US 8,834,699 B1
(45) Date of Patent: Sep. 16, 2014

(54) METHOD OF ANODIZING

(75) Inventor: Todd Knowles, Glendale, AZ (US)

(73) Assignee: Tantalum Pellet Co., Phoenix, AZ (US)

( * ) Notice: Subject to any disclaimer, the term of this patent is extended or adjusted under 35 U.S.C. 154(b) by 56 days.

(21) Appl. No.: 13/546,933

(22) Filed: Jul. 11, 2012

Related U.S. Application Data

(60) Division of application No. 11/427,066, filed on Jun. 28, 2006, now Pat. No. 8,241,470, and a continuation-in-part of application No. 12/608,238, filed on Oct. 29, 2009, which is a division of application No. 11/849,198, filed on Aug. 31, 2007, now Pat. No. 7,773,367, which is a continuation-in-part of application No. 11/380,504, filed on Apr. 27, 2006, now Pat. No. 7,301,754.

(51) Int. Cl.
*C25D 11/04* (2006.01)

(52) U.S. Cl.
USPC ............................ 205/322; 205/148; 205/316

(58) Field of Classification Search
USPC .................................................. 205/322, 148
See application file for complete search history.

(56) References Cited

U.S. PATENT DOCUMENTS 2,780,019 A * 2/1957 Sullivan ...................... 42/76.02
3,137,058 A 6/1964 Giacomello
3,277,553 A 10/1966 Wesolowki
3,349,295 A * 10/1967 Sparkes ......................... 361/509
3,548,265 A 12/1970 J.B. Buice et al.
3,817,782 A 6/1974 Klein et al.
4,024,625 A 5/1977 England
4,298,906 A 11/1981 Elias
4,942,500 A 7/1990 Libby et al.
5,001,607 A 3/1991 Breithaupt
5,043,849 A 8/1991 Libby
5,105,341 A 4/1992 Stephenson et al.
5,198,968 A * 3/1993 Galvagni ...................... 361/529
5,777,840 A 7/1998 Oney
6,261,434 B1 * 7/2001 Melody et al. ................ 205/171
6,562,223 B2 * 5/2003 Rasmussen ................... 205/324
6,679,980 B1 * 1/2004 Andreacchi ................... 204/272
6,802,951 B2 * 10/2004 Hossick-Schott ............ 205/108
6,952,339 B1 10/2005 Knowles
7,511,944 B2 * 3/2009 Kuriyama ..................... 361/535
7,773,367 B1 * 8/2010 Knowles ....................... 361/529
2004/0252445 A1 * 12/2004 Wang ............................ 361/508

* cited by examiner

*Primary Examiner* — Bryan D. Ripa
(74) *Attorney, Agent, or Firm* — Booth Udall Fuller, PLC

(57) ABSTRACT

A method of anodizing that is performed in the capacitor case. The anode and a formation cathode are inserted into the capacitor case. The formation cathode includes one or more passageways through which formation electrolyte is transferred to contact the surface of the anode. In one particular implementation, the anode includes several slots and the formation cathodes are plates that are inserted into the slots. One or more valves coupled to formation electrolyte storage tanks storing different electrolytes may be coupled to the formation cathode. A rinsing step can be performed by supplying water through the passageways in the formation cathode. Other implementations anodize outside the capacitor case.

21 Claims, 4 Drawing Sheets

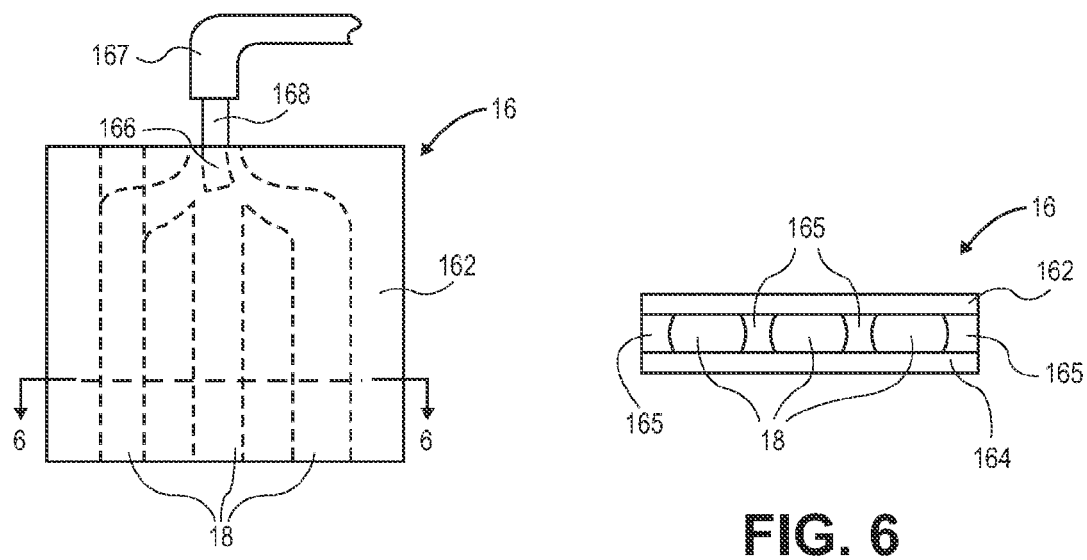
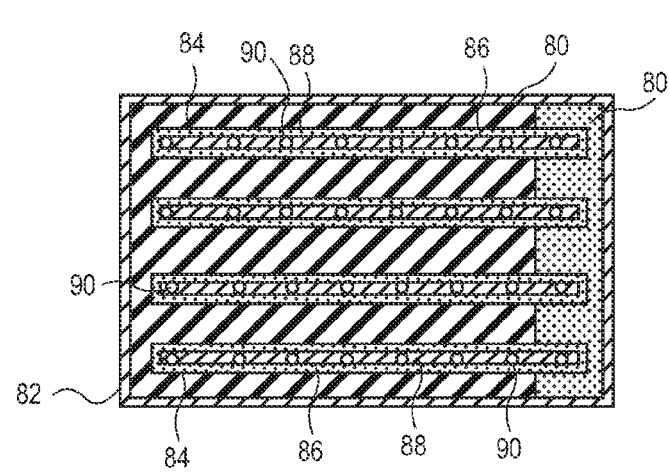

METHOD OF ANODIZING

CROSS REFERENCE TO RELATED APPLICATIONS

The present application is a divisional application of application Ser. No. 11/427,066 to Todd Knowles entitled "Method of Anodizing" which was filed on Jun. 28, 2006, now U.S. Pat. No. 8,241,470 the disclosure of which is hereby incorporated herein by reference.

The present application is continuation-in-part application of application Ser. No. 12/608,238 to Todd Knowles entitled "Capacitor" which was filed Oct. 29, 2009, which was a divisional application to earlier application Ser. No. 11/849,198 to Todd Knowles entitled "Capacitor" which was filed Aug. 31, 2007, now U.S. Pat. No. 7,773,367, which was a continuation-in-part application to earlier application Ser. No. 11/380,504 to Todd Knowles entitled "Capacitor" which was filed Apr. 27, 2006, now U.S. Pat. No. 7,301,754.

BACKGROUND

1. Technical Field

Aspects of this disclosure relate generally to a method of anodizing a capacitor anode. More specific implementations of an anodizing method involve placing an anode in a capacitor case, placing a formation cathode within the capacitor case and supplying formation electrolyte through passages in the formation cathode so that the formation electrolyte is in direct contact with the surface of the anode. In a particular implementation, the anode includes one or more wells and one or more formation cathodes are inserted into the wells.

2. Background Art

Generally, an anode of a capacitor is anodized and then inserted into the capacitor case. Such an anodizing method generally includes connecting the anode material to a positive terminal of a power supply, connecting a formation cathode to the negative terminal of the power supply and supplying formation electrolyte. When the circuit is closed, an oxide layer forms on the anode over time. The anode is conventionally placed in the capacitor case after this anodizing procedure is complete.

A known method of anodizing includes immersing anodes in electrolyte, as described in U.S. Pat. No. 3,277,553 to Wesolowski ("Wesolowski"), U.S. Pat. No. 3,137,058 to Giacomello ("Giacomello"), U.S. Pat. No. 6,952,339 to Knowles, and other patents and publications. In the disclosures of Wesolowski, Giacomello and Knowles, the anodes are placed in the capacitor assembly after this anodizing method is performed. The disclosures of Wesolowski, Giacomello and Knowles are hereby incorporated herein by reference.

A known capacitor assembly includes an anode that surrounds a cathode, as disclosed in U.S. Pat. No. 3,349,295 to Sparkes ("Sparkes"), among other patents and publications. Sparkes includes a hollow cylindrical anode surrounding a cylindrical cathode pellet core. In the disclosure of Sparkes, the anode is placed in the capacitor container after it is formed and anodized. The disclosure of Sparkes is hereby incorporated herein by reference.

SUMMARY

In one aspect, this disclosure features continuous or intermitent, direct or indirect, delivery of formation electrolyte to anode material as an anodizing step. In another aspect, this disclosure features a method for anodizing after the anode is placed in the capacitor case. In a particular implementation of the method, the anode includes tantalum anode material defining one or more slots. One or more formation cathodes are disposed in the slots and formation electrolyte is delivered through passages in the formation cathodes, thereby contacting the surfaces of the anode where it is desirable to form an oxide. After anodizing, the formation cathodes are removed, capacitor cathodes are placed in the slots and other conventional capacitor assembly steps are performed.

One advantage of the method disclosed herein is that the anode may remain in the capacitor case during anodizing, thereby eliminating the need to transport the anode after the anodization step is completed, which could potentially damage the oxide layer. Another advantage of the method disclosed herein is that it ensures complete anodization of the porous anode in a relatively short time period. Still another advantage of the method disclosed herein is that a relatively small amount of formation electrolyte is needed since the formation electrolyte is delivered directly onto the desired surfaces of the anode. Since the amount of formation electrolyte is relatively small, fresh electrolyte may be used every time instead of having a large holding tank of formation electrolyte that may contain contaminants and unwanted by-products.

The method for anodizing may be applied to conventional capacitor shapes, sizes and materials. The method may also be applied to capacitors that have unconventional shapes, sizes and materials. The method may also be applied to the formation of cathodes.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 5 is a front view of a formation cathode;

FIG. 6 is a cross-sectional view of a formation cathode taken along sectional line 6-6 in FIG. 5;

FIG. 7 is a top-down cross-sectional view, similar to the view of FIG. 2, of a capacitor during an anodizing method, the capacitor having a rectangular shape;

DESCRIPTION

This disclosure, its aspects and implementations are not limited to the specific components, methods and assembly procedures disclosed herein. Many additional components, methods and assembly procedures known in the art consistent with the intended capacitor, methods and/or assembly procedures for a capacitor will become apparent for use with implementations of the methods of anodizing from this disclosure. Accordingly, for example, although particular hardware is disclosed, such hardware and implementing components may comprise any size, shape, style, type, model, version, measurement, concentration, material, quantity and/or the like as is known in the art for such hardware and implementing components, consistent with the intended operation of anodizing and assembling a capacitor. The disclosure is not limited to use of any specific components, provided that the components selected are consistent with the intended capacitor and/or method of anodizing and assembling a capacitor.

Generally, a method for anodizing comprises providing an anode, placing the anode in a capacitor case, inserting one or more formation cathodes into the capacitor case and supplying formation electrolyte through passages in the formation cathode(s), thereby forming a continuous oxide on the desired surfaces of the anode. Subsequent to the anodizing process, the formation cathodes are removed, capacitor cathodes are inserted into the capacitor case and the assembly of the capacitor is completed by performing such steps as filling the capacitor container with electrolyte, sealing the capacitor container, and other conventional capacitor assembly procedures.

Figure 3:
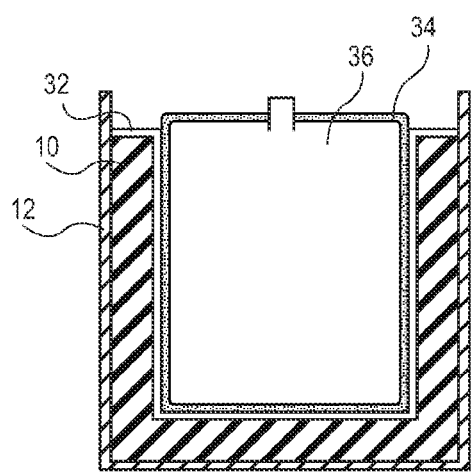
FIG. 3 is a cross-sectional view of a capacitor after the anodizing method taken along sectional line 1-1 in FIG. 2 without the specific passageways showing.
Figure 4:
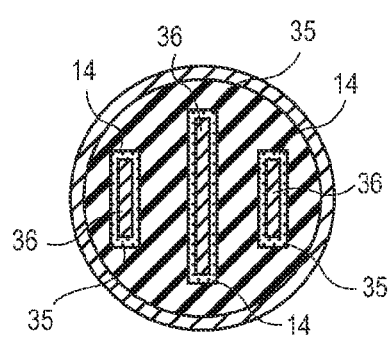
FIG. 4 is a cross-sectional view of a capacitor after the anodizing method with cathode plates deposited in the wells, similar to the view of FIG. 2 taken during the anodizing method.

In a particular implementation, the anodizing method is shown in FIGS. 1-4. In this particular implementation, the shape of the anode is unconventional. However, one of ordinary skill in this art will recognize that the method can be readily applied to conventional anode shapes as well as any other desired anode shapes. Shaped anode material 10 is placed in a capacitor case 12. The anode material 10 of this particular anode implementation includes a plurality of wells in the form of slots 14. Slots are wells that have a length much longer than their width (i.e. four to ten times more). The anode material 10 may be shaped in the case or shaped outside the case 12 and later placed in the case. Formation cathodes 16 are placed in the slots 14. The formation cathodes 16 include passages 18. Formation electrolyte 20 is delivered to the formation cathodes 16 and through the passages 18 to contact the surfaces of the slots 14 in the anode material 10. The formation cathodes 16 are connected to the negative terminal 22 of the power supply 26 while the anode material 10 is connected to the positive terminal 24 of the power supply 26. When the circuit is closed, an oxide layer 32 forms on the anode material 10, as shown in FIGS. 3 and 4.

After anodization is complete, the formation cathodes 16 are removed and the capacitor is assembled. In this particular implementation, cathode plates 36 are placed in the slots 14 and a suitable separator material 35 is placed between the anode 10 and the cathode plates 36. The remaining steps for assembling the capacitor, such as adding electrolyte and connecting the header to the case 12, are conventional. The materials used for the anode material 10, capacitor case 12 and separator material 35 are all conventional materials known in the art. Components of the method and the capacitor assembly are discussed in more detail below.

The anodizing method is not limited to anodes that include slots, but could also be applied to other anode shapes. For example, the anode could include one or more wells shaped to receive cathodes of other shapes and sizes, such as cylindrical, circular discs, square or triangle discs, cubes and other shapes, and these wells may extend partially or entirely through the anode material. The slots may be shaped in the anode during pressing of the powder anode material or by subsequent removal of the anode material. The formation cathode would be of a shape and material that can be applied to an anodizing method implementation discussed herein. Typically, the shape of the formation cathode is substantially the same shape as the cathode that will comprise the capacitor, though this is not required. Therefore, if the anode material is a hollow cylinder, such as the anode disclosed by Sparkes (U.S. Pat. No. 3,349,295, previously incorporated by reference), the formation cathode would be a cylinder that fits within the hollow portion of the anode. If the anode material is a cylinder, such as the anode disclosed by Knowles (U.S. Pat. No. 6,952,339, previously incorporated by reference), the formation cathode would be a hollow cylinder that fits around the anode material. The anodizing method could easily be adapted for other anode and formation cathode shapes.

The anode 10 is made of a material that is capable of forming a dielectric when exposed to the formation electrolyte and an appropriately configured electrical current. In addition, the anode 10 material must be compatible with the other capacitor components, such as the capacitor case, electrolyte and cathode. Examples of appropriate anode materials include, but are not limited to, tantalum, titanium, aluminum and niobium and mixtures thereof. The anode may be shaped by compressing the powdered metal into a desired anode shape, and sintering under a vacuum at high temperatures. The anode may be shaped within the case or shaped separately and deposited into the case. Other conventional anode materials and anode-shaping methods could be employed as well. In addition, the anodizing method could be used for anodes of any size.

The formation cathode may be made of an electrically conductive material that is compatible with the formation electrolytes being employed. For example, 316 stainless steel can be used as the formation cathode material. Less commonly, tantalum may alternatively be used. In one particular implementation, shown in FIGS. 5 and 6, the formation cathode 16 is formed of two plates 162 and 164 with passageways 18 running between them. The passageways 18 are configured such that formation electrolyte flows through the passageways 18 into the anode well and contacts the surface of the anode material 10. The two plates 162 and 164 may be welded or otherwise coupled to the flattened or sufficiently smaller diameter end 166 (shown in phantom in FIG. 5) of a stainless steel tube 168 that connects to flexible tubing 167. The passageways 18 may also be created by spot welding in a pattern to form channels between the plates 162 and 164. Spot welds 165 are shown in FIG. 6. Although only one entry port for this particular implementation is shown, which then splits into multiple passageways 18, multiple entry ports may alternatively be included. The electrolyte may also be supplied to the anode through a separate tube.

Placement of the formation cathode with a dedicated electrolyte supply flow to the anode being anodized provides additional cooling for the anode oxide layer formation process, removes undesirable bubbles and formation byproducts, and provides fresh electrolyte for the formation process. Although particular implementations of the process illustrate the anodes being anodized within their respective capacitor cases, the anode being formed within its final capacitor case is not required. Alternatively, some other formation container may be used and a dedicated electrolyte supply to the container holding one or more anodes could be provided. This may equivalently achieve many of the same benefits as forming the anode within the final capacitor case. It is important, however that the container be of a size & shape so that it fits the anodes very closely. Volume in the container in addition to that occupied by the anode or anodes wastes electrolyte & makes changing electrolytes and/or rinsing much less efficient.

Thus, distinct from conventional processes where a plurality of anodes are held within a very large tank and electrolyte is passed by them, micro-tanks could be used, each holding one or more anodes (much like that shown in FIG. 1) with the electrolyte being supplied more or less directly to the individual anode or anodes being formed. In such systems, the micro-tank containers would be of a size not more than about ten (10) times the total volume of the anodes contained within each container, and in particular implementations not more than about five (5) times the total volume of the anodes contained within each container. Use of a significantly smaller tank than is conventionally used increases the effectiveness of the fluids delivered and the efficiency of fluid delivery. The electrolyte supply for a particular container or case could be configured completely separate from the electrolyte supplies for the other containers or cases, or could be configured as a common electrolyte supply with separate supply lines to each container or case. They could be separated at the source through separate supply lines, or separated at some other point prior to reaching the individual containers. The electrolyte may be supplied by pumping, gravity feed or other method of transferring electrolyte to the anode.

Delivery of the formation electrolyte(s) may be through a continuous flow for each electrolyte or through intermitent flow, such as through a plurality of long or short, but strong, pulses of formation electrolyte. The use of formation electrolyte pulses may assist in purging old electrolyte and replacing it with new electrolyte during the anodizing process.

The composition and flow rate of the formation electrolyte 20 can be customized to form an oxide 32 with desired properties and thickness appropriate to desired capacitor characteristics given the particular capacitor materials used. Those of ordinary skill in the art of anodizing are familiar with the parameters of anode formation in a suitable electrolyte and will readily be able to adapt the present methods to forming anodes of all types and characteristics. The formation electrolyte composition is selected such that the oxide is insoluble therein or dissolves at a slower rate than it forms. In a particular implementation, the formation electrolyte contains about 10% glycerine, about 0.1% to 1% phosphoric acid, and the remainder de-ionized water, and the continuous flowrate of the formation electrolyte is between about 0.01 and 5 cc/min per gram of anode weight. When a pulsed flow is used, the flowrate would be approximately double that of a continuous flow & would have a duty cycle of between 5% & 70% with a cycle time of between approximately 0.5 seconds to 5 minutes. Other compositions and flowrates of the formation electrolyte could be used, based on the anode material and the desired properties of the oxide to be formed.

The anodizing method is easily adapted to include two or more different formation electrolyte solutions. Because the electrolyte is supplied from a container or a mixing device, the composition can be easily changed during the formation process. For example, it may be advantageous if one were intending to form a high voltage oxide, to begin with a high conductivity electrolyte which can be made with about 1% or more phosphoric acid. However as the voltage across the oxide increases, it may be desirable to reduce the conductivity so that momentary flaws that occur in the oxide as it is being formed do not allow so much current to flow that damaging heat is generated. This is easily accomplished by switching the electrolyte being supplied to one containing a smaller percentage, of perhaps 0.1% phosphoric acid.

Figure 1:
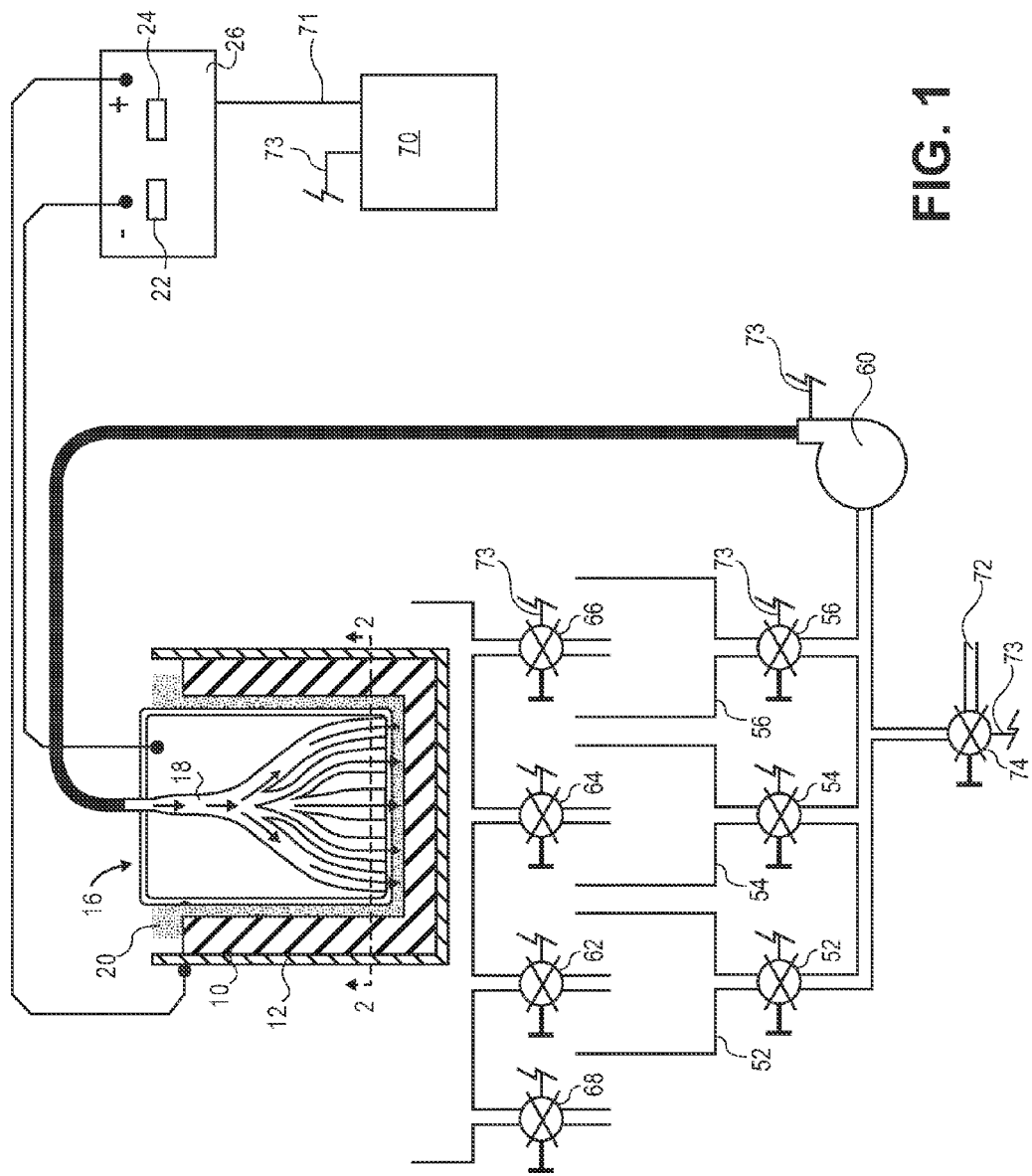
FIG. 1 is a cross-sectional view of a system for a method of anodizing, where a portion of the cross-sectional view is taken along sectional line 1-1 in FIG. 2.
Figure 2:
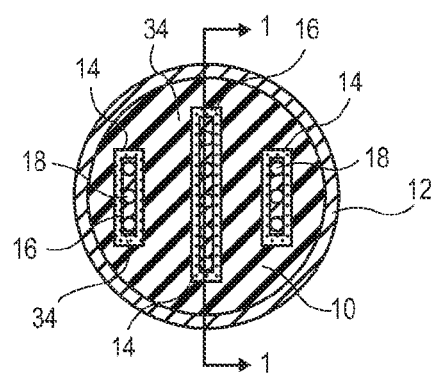
FIG. 2 is a cross-sectional view of a capacitor during the anodizing method taken along sectional line 2-2 in FIG. 1.

The system for using more than one formation electrolyte is shown in FIG. 1. In this particular implementation, three different electrolyte solutions are used in the anodizing method. Each of the three tanks 42, 44 and 46 contains a different electrolyte solution. The first formation electrolyte in tank 42 is utilized by opening the first electrolyte selection valve 52 and operating pump 60, thereby providing the first formation electrolyte to the formation cathode 16. Similarly, the second and third formation electrolytes in tanks 44 and 46, respectively, are utilized by opening second and third electrolyte selection valves 54 and 56, respectively. The three different electrolyte solutions can be used one at a time by opening just one of the valves 52, 54 or 56. A controller 70 may be included to interface with the power supply 26, the valves 52, 54, 56, 62, 64, 66, 68, and 74, the operating pump 60, and any other component that may need to be activated, deactivated or adjusted. Although these components of the system may be worked manually, it is anticipated that computer regulation and manipulation of the system will be most convenient. Through computer control, the process may be automated such that the anodization process applies the proper voltages, currents and electrolytes for appropriate durations automatically without constant attendance. Communication between the controller 70 and each of the various components may be accomplished through wired 71 connection or wireless 73 connection.

Alternatively, a combination of two or three of the solutions, or measurable mixtures thereof, can be used by simultaneously opening two or three of the valves 52, 54 and 56. The electrolyte solutions are supplied through the formation cathode 16 to contact the anode 10 surface and then out of the capacitor case 12 and back into tank 42, 44 or 46 from which it came by opening an electrolyte return valve 62, 64 or 66, respectively. Alternatively, rather than recycle the electrolyte solution, drain valve 68 may be opened, thus allowing the used electrolyte solution to drain out of the system. One advantage of allowing the used electrolyte solution to drain is that only pure electrolyte solution would then be used in the anodizing method, thus preventing unwanted by-products and contaminants in the formation electrolyte. The number of tanks containing different electrolyte solutions is not limited to three. There can be greater or fewer tanks, depending upon the number of desired electrolyte solutions in the anodizing method.

Rinsing with a solvent, such as de-ionized water, can be performed between electrolyte solutions or upon completion of anodizing. The method and system shown in FIG. 1 can easily be adapted to provide a water rinse step. Clean rinse water is provided to the system through inlet 72 when valve 74 is open. In the case where it is desired to use non-compatible electrolytes consecutively during the formation process, thorough rinsing of the first electrolyte from the anode allows the second electrolyte to be introduced without concern for interaction between them. It is also desirable to perform a thorough rinse after the formation process is complete to remove any excess formation electrolyte before adding the capacitor electrolyte. A water rinse step could easily be performed at any point in the anodizing method, including prior to introducing any formation electrolyte.

In addition to the various liquids mentioned above, the fluids supplied to the anodes may include gases. For example, hot or dried air may be supplied to the anodes following a rinse step in order to dry them. Or very hot air having a temperature of about 200° to 450° may be supplied to the anodes to perform a heat treatment step as is commonly used in the industry. The use of other gases for these and other purposes may also prove beneficial now that it is possible to economically use them.

The power source 26 delivers a current that is sufficient to create an oxide with a desired final formation voltage. The current is usually between about 1 and 100 mA per gram of anode weight. The oxide gets thicker in relation to the amount of current that has flowed and presents an increasing resistance to the flow of the current. In accordance with Ohm's Law, the voltage between the anode connection and the cathode increases. Final formation voltages could range from as low as about 3 volts to as high as about 450 volts or even higher. In a particular implementation, the current setting remains constant until the voltage across the oxide is equal to the intended formation voltage. Power sources used for formation have adjustable voltage settings that the device will not exceed. This setting is used to set the formation voltage so that once it is reached, the anodes will be 'held' at that voltage and not go any higher. In another particular implementation, the current to the anodes is reduced as the voltage increases. In still other particular implementations, the power source is programmed to follow a schedule where the current is either turned off or reduced at points during the process. Sometimes interim voltages are held in the same way as the final voltage is held.

After the anodizing method is complete, the remaining steps for completing the capacitor are conventional. The formation cathode is removed and a capacitor cathode is placed in the appropriate place in the capacitor case. For the implementation shown in FIG. 1, the capacitor cathode plates 36 are placed in the slots 14 in the anode 10. The capacitor cathodes are made of conventional materials, such as tantalum, niobium, carbon, graphite, aluminum, palladium, platinum and/or ruthenium oxide. A conventional separator is placed between conventional cathode and anode materials. The capacitor cathode is formed by conventional methods, such as pressing and sintering, shaping from homogeneous material and/or coating. In the particular implementation shown in FIG. 1, the capacitor cathode plates 36 are formed of conventional materials by conventional methods. For example, the plates 36 may include a conductive substrate coated with a capacitive material. The cathode plates 36 may be coupled to a cathode lead which is made accessible from outside the finished capacitor. There is no intended implication of a particular number of cathode(s) or anode well(s) from this disclosure. Any desired number could be used.

The capacitor case is of a conventional size, shape and composition. In addition, the methods of forming and assembling the capacitor case are conventional. For example, the capacitor case can be a hollow cylinder open at one end, such as those disclosed by Knowles (U.S. Pat. No. 6,952,339, previously incorporated by reference) and Sparkes. (U.S. Pat. No. 3,349,295, previously incorporated by reference). The capacitor case can alternatively be rectangular or any other shape disclosed in the prior art. The material of the capacitor case can be the same material used for the anode. The composition of the capacitor case is compatible with the other capacitor components, such as the cathode, anode and electrolyte. For example, the case material does not react with the formation electrolyte or the electrolyte used in the capacitor assembly, is capable of forming a dielectric and can protect the components within the case.

An electrically insulative separator material (not shown) is placed between the anode material 10 and the formation cathode 16 to prevent electrical short circuit. Similarly, an electrically insulative separator material 34 is placed between the anode 10 and the cathode 36 in the final capacitor assembly. However, it may be desirable to include tougher protection as a separator material for the formation cathode 16 than for capacitor cathode 36 because the formation cathode 16 will be inserted and removed many times. Both separator materials, however, should be unreactive with the anode and formation cathode or capacitor cathode materials. The separator materials must be unreactive with and insoluble in the formation electrolyte and/or the capacitor electrolyte. In addition, the separator materials should have a degree of porosity sufficient to allow flow therethrough of the formation electrolyte and/or capacitor electrolyte. Illustrative separator materials include woven and non-woven fabrics of polyolefinic fibers including polypropylene and polyethylene or fluoropolymeric fibers including polyvinylidene fluoride, polytetrafluoroethelene (Teflon®), polyethylenetetrafluoroethylene, and polyethylenechlorotrifluoroethylene laminated or superposed with a polyolefinic or fluoropolymeric microporous film, non-woven glass, glass fiber materials and ceramic materials.

The electrolyte used in the capacitor assembly has a conventional composition, but should also be compatible with the other capacitor component materials, such as the anode material, cathode material and the material of the capacitor case. The electrolyte may be solid or liquid and is put into the capacitor case using conventional processes. For example, a liquid electrolyte may be supplied to the capacitor case through a designated lead tube in the header before the hole is sealed.

Figure 8A:
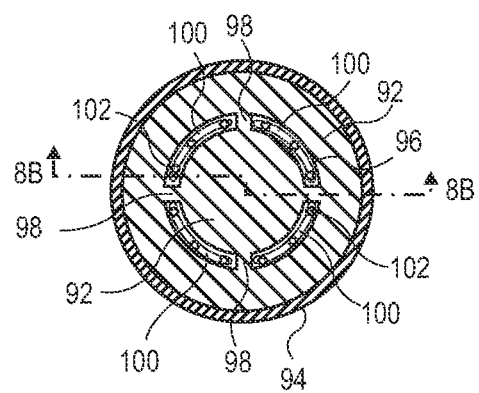
FIG. 8A is a top-down cross-sectional view, similar to the view of FIG. 2, of a capacitor during an anodizing method, the capacitor anode of FIG. 8B having a cylindrical slot therein taken along sectional line 8A-8A.
Figure 8B:
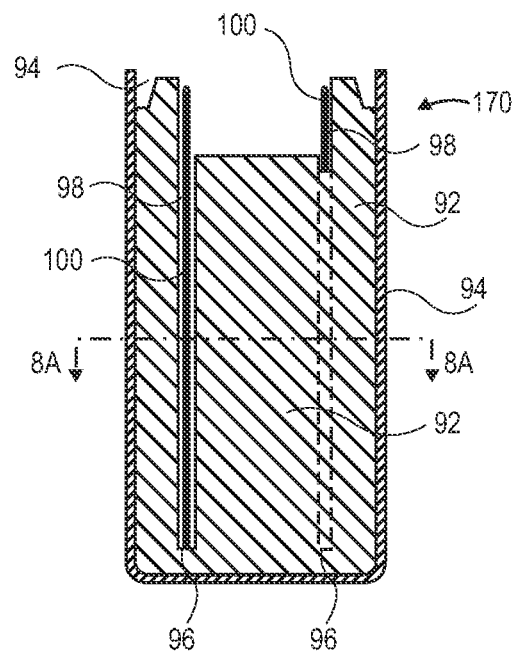
FIG. 8B is a cross-sectional view of the capacitor of FIG. 8A taken along sectional line 8B-8B.

FIG. 7 illustrates an anode material 80 shaped into a rectangular case 82, the anode material 80 having slots 84, therein. A separator material 86 is included between the anode material 80 and the formation cathodes 88. Passageways 90 are included along the formation cathodes 88. FIGS. 8A and 8B illustrate an anode material 92 shaped into a cylindrical case 94, the anode material 92 having a cylindrical slot 96 therein. A separator material 98 is included between the anode material 92 and the formation cathode 100. Passageways 102 are included along the formation cathode 100. Similar to earlier implementations, formation electrolyte may be supplied to the passages of the formation cathodes to contact the surfaces of the wells. The formation cathodes are connected to the negative terminal of the power supply and the anode material is connected to the positive terminal. When the circuit is closed, an oxide layer forms on the anode material. After anodization is complete, the formation cathodes are removed and the capacitor is assembled.

These and other shaped anode configurations are shown and described in co-pending, co-owned U.S. patent application Ser. No. 11/380,504, filed on Apr. 27, 2006, entitled "Capacitor." The disclosure of this co-pending, co-owned application is hereby incorporated herein by this reference.

It will be understood that implementations are not limited to the specific components disclosed herein, as virtually any components consistent with the intended operation of a method and/or system implementation for a capacitor may be utilized. Accordingly, for example, although particular shapes and sizes of capacitor components may be disclosed, such components may comprise any shape, size, style, type model version, class, grade, measurement, concentration, material, weight, quantity, and/or the like consistent with the intended operation of a method and/or system implementation for a capacitor may be used. While the anodizing method for a capacitor anode has been described with an anode and formation cathode of a particular shape with reference to the drawing figures, it will be understood that the anode and formation cathode shapes are not limited to those depicted.

The anode and formation cathode shapes described and depicted in the drawings are given as examples and not as limitations.

In places where the description above refers to particular implementations of a method of anodizing, it should be readily apparent that a number of modifications may be made without departing from the spirit thereof. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning and range of equivalency of the claims are intended to be embraced therein.

The invention claimed is:

1. A method of anodizing an anode for a capacitor, the method comprising:
   providing a capacitor case;
   placing anode material having a plurality of wells within the capacitor case;
   placing a formation cathode within at least one well of the plurality of wells within the capacitor case, each well contiguously surrounded on at least two opposing sides by the anode material; and
   after the step of placing the anode material within the capacitor case, performing an anodizing step including delivering a first formation electrolyte to the anode material by pumping electrolyte directly within at least a first well of the plurality of wells.

2. The method of claim 1, wherein the anodizing step further comprises:
   delivering the first formation electrolyte within the at least one well through at least one passage in the formation cathode.

3. The method of claim 1, wherein the anode includes a cylindrical well among the plurality of wells and the formation cathode is a hollow cylinder configured to surround at least a portion of the anode material.

4. The method of claim 1, wherein the formation cathode is cylindrical and the anode material is shaped to surround at least a portion of the formation cathode.

5. The method of claim 1, wherein the anodizing step comprises delivering the first formation electrolyte through at least one passageway in the formation cathode.

6. The method of claim 2, wherein the formation cathode comprises two plates with the at least one passageway therebetween.

7. The method of claim 1, further comprising placing a separator material between the anode material and the formation cathode.

8. The method of claim 2, further comprising placing a separator material between the anode material and the formation cathode.

9. The method of claim 1, further comprising supplying a second formation electrolyte, different from the first formation electrolyte, within the second well.

10. The method of claim 9, further comprising rinsing with a solvent before supplying the second formation electrolyte.

11. The method of claim 10, wherein the solvent is water.

12. The method of claim 1, further comprising rinsing the anode material with a solvent after performing the anodizing step.

13. The method of claim 5, further comprising delivering a second formation electrolyte, different from the first formation electrolyte, through the at least one passageway in the formation cathode.

14. The method of claim 13, further comprising rinsing with a solvent between the steps of supplying the first formation electrolyte and supplying the second formation electrolyte.

15. The method of claim 5, further comprising delivering a second formation electrolyte, different from the first formation electrolyte, within the second well.

16. The method of claim 15, further comprising rinsing with a solvent between the steps of delivering the first formation electrolyte and delivering the second formation electrolyte.

17. The method of claim 1, wherein the plurality of wells comprises at least one slot.

18. The method of claim 1, further comprising delivering at least one gas within the at least one well after the step of delivering the first formation electrolyte.

19. The method of claim 18, wherein the at least one gas is a heated gas.

20. The method of claim 1, wherein delivering the first formation electrolyte to the anode material comprises delivering the first formation electrolyte intermittently.

21. The method of claim 20, wherein delivering the first formation electrolyte intermittently comprises delivering the first formation electrolyte in a plurality of pulses of formation electrolyte.

* * * * *